United States Patent [19]
Hesener

[11] 3,780,453
[45] Dec. 25, 1973

[54] QUESTION AND ANSWER EDUCATIONAL GAME WITH AN ANSWER CONTROL DEVICE

[76] Inventor: Walter Hesener, 66, Rue de la Prulay, Geneve, Switzerland

[22] Filed: Mar. 30, 1971

[21] Appl. No.: 129,469

[30] Foreign Application Priority Data

| | | |
|---|---|---|
| Mar. 31, 1970 | Switzerland | 4696/70 |
| May 29, 1970 | Switzerland | 8136/70 |
| Sept. 5, 1970 | Switzerland | 13300/70 |
| Nov. 20, 1970 | Switzerland | 17285/70 |
| Nov. 30, 1970 | Switzerland | 17659/70 |

[52] U.S. Cl. .................... 35/48 R, 35/9 R
[51] Int. Cl. .............................. G09b 3/00
[58] Field of Search .............. 35/9 A, 9 F, 9 R, 35/9 B, 9 E, 48 R

[56] References Cited
UNITED STATES PATENTS

| | | | |
|---|---|---|---|
| 2,871,577 | 2/1959 | Davis | 35/9 A |
| 3,324,577 | 6/1967 | Davis | 35/48 R |
| 3,230,642 | 1/1966 | Goldschmidt | 35/9 |
| 2,311,055 | 2/1943 | Kopas | 35/22 |
| 3,146,531 | 9/1964 | Whitney | 35/9 |
| 2,970,387 | 2/1961 | Dean | 35/9 |
| 3,504,445 | 4/1970 | Goldmark et al. | 35/9 |
| 2,690,621 | 10/1954 | Dean | 35/9 |
| 3,324,577 | 6/1967 | Davis | 35/48 R |

Primary Examiner—Robert W. Michell
Assistant Examiner—J. H. Wolff
Attorney—Fleit, Gipple & Jacobson

[57] ABSTRACT

An educational question-and-answer game has an answer verifying apparatus which has a code member having at least one code alignment, and a co-operating setting device. The latter device is supported by a supporting member. The code and supporting members are each provided with part of an indicating device, and can be brought into various relative positions which are differently designated by the indicating device, in such a way that the setting device is associated with a different longitudinal unit of code alignment in each of the said positions. The setting device can be moved into at least two positions in order to answer any one of the questions asked, and can be brought into registry with the appropriate longitudinal unit of code alignment. The answer verifying apparatus has means for multiplying its verifying capacity, which results from the number of different positions of the code member relative to the supporting member or the longitudinal units of code alignment, and for improving the enciphering of the possible verifications. Such means take the form of a plurality of differently designated setting devices (9) in FIG. 1 of the drawings for answering a corresponding plurality of questions per setting position of the code member (3, 4 in the drawings) relative to the supporting member (1). Alternatively the verifying capacity is enhanced by the construction of at least one of the code and supporting members (3, 4, 1) as parts (3, 4) which are each provided with part (3g, 4e) of a further indicating device. These parts can be brought into various relative positions, these positions being differently designated by the indicating device.

44 Claims, 23 Drawing Figures

Inventor
Walter Hesener

Fleit, Gipple & Jacobson
Attorneys

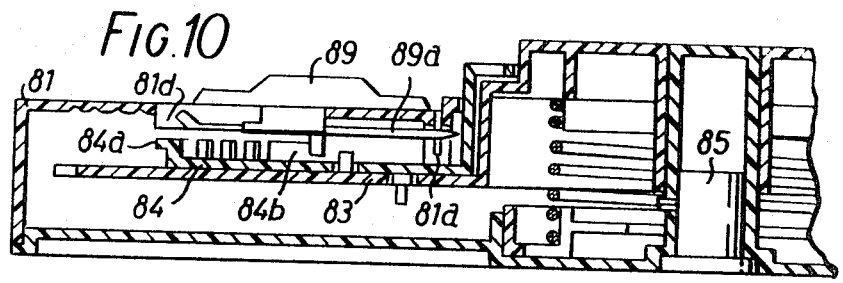
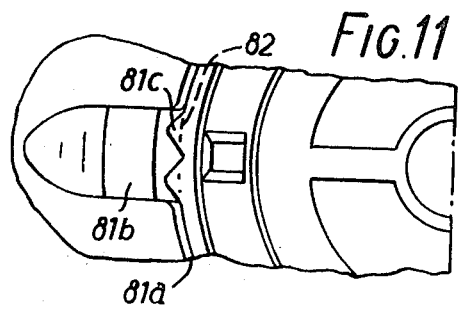
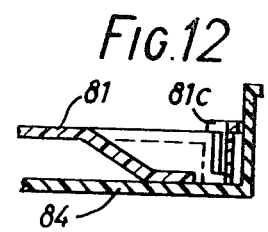
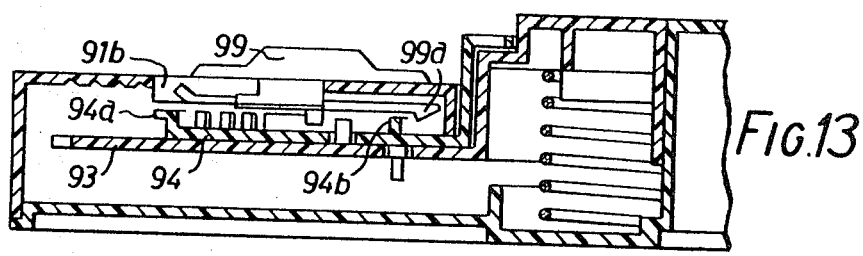
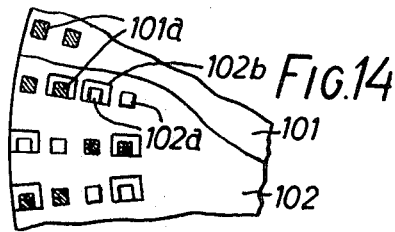
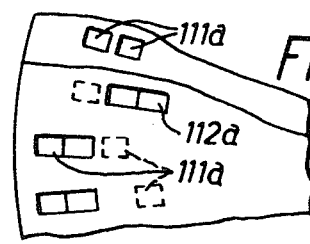
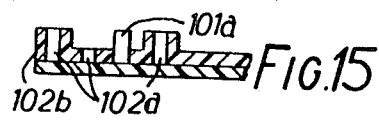
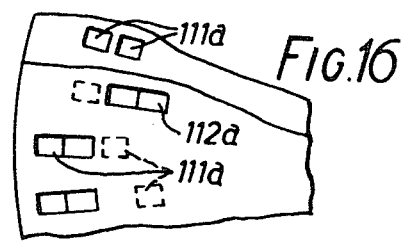

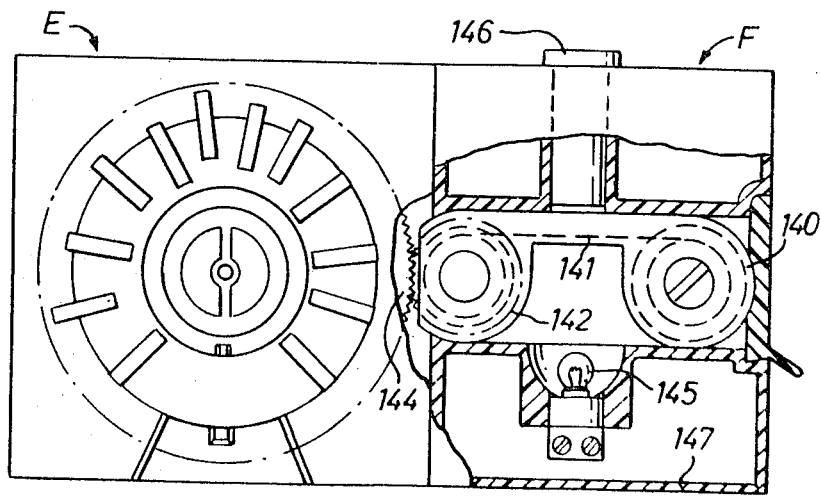
Fig.21
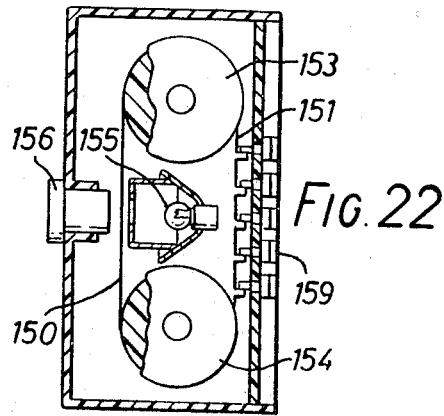
Fig.22
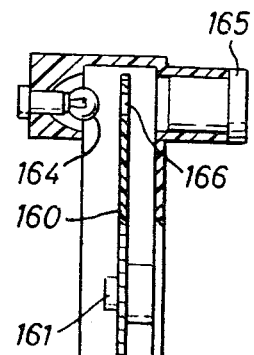
Fig.23
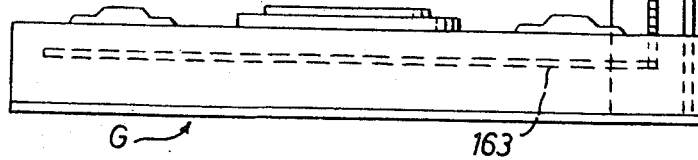

QUESTION AND ANSWER EDUCATIONAL GAME WITH AN ANSWER CONTROL DEVICE

This invention relates to apparatus for playing an educational question and answer game in which one of several possible answers is chosen for a given question.

Such question and answer games are useful as a teaching medium in schools and for entertainment. Prior proposed apparatuses for playing such games are either very complex and expensive or else they have only capacity for a very small number of question and answer combinations.

It is an object of this invention to provide an easily operated apparatus for playing an educational question and answer game. It is a further object to provide such apparatus which may be simply constructed and operates by simple mechanical means yet provides a large number of possible question and answer combinations.

According to the invention there is provided apparatus for playing an educational question and answer game comprising:

a. a housing;
b. a plurality of setting means supported at a plurality of stations by the housing and having a portion disposed externally of the housing so as to be operable from outside the housing to be moved between at least two positions, each such position being representative of one of several possible answers to a given question;
c. code bearing means supported by, and concealed within, the housing;
d. a plurality of code means on the code bearing means adapted to cooperate successively with each setting means;
e. means mounting the setting means and the code bearing means for step-by-step movement with respect to one another, said movement being in a direction other than the aforesaid movement of the setting means between said at least two positions; and
f. indicating means indicating the relative step position of the setting means and code bearing means.

A preferred embodiment of the invention hereinafter described includes visual and/or audible indication that correct answers have been chosen to a given set of questions. This indication will hereinafter be referred to as a verifying step or switching step as is appropriate in each embodiment. This step is illustrated as, for instance, the setting means and the code bearing means advancing by one step movement, an electric light being switched on, a light showing for each correct answer of a plurality of answers, or the ringing of a bell.

The invention is also illustrated in combination with a plurality of question sheets which may be housed in a cavity defined by the housing of the apparatus. Illicit removal of the question sheets or pages is prevented and the pages are released from the cavity in a predetermined order only when the previous set of questions has been correctly answered.

The invention is also described in combination with transparencies showing the questions and includes means for viewing the transparencies.

Preferred embodiments of the invention will now be described by way of example with reference to the accompanying drawings, in which.

Figure 1:
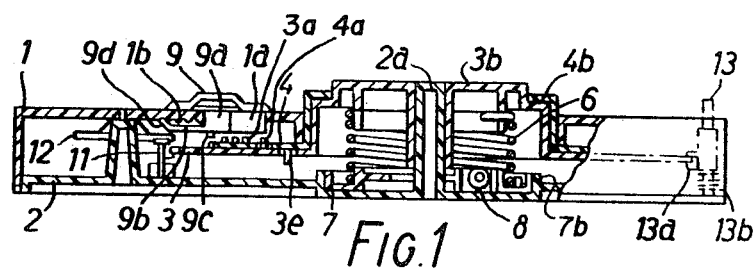
FIGS. 1 and 2 show apparatus according to the invention provided with a two part code bearing means mounted rotatably and axially displaceably in a housing, FIG. 2 being a partly broken away plan view and FIG. 1 being in cross section along the lines 11 of FIG. 2.
Figure 18:
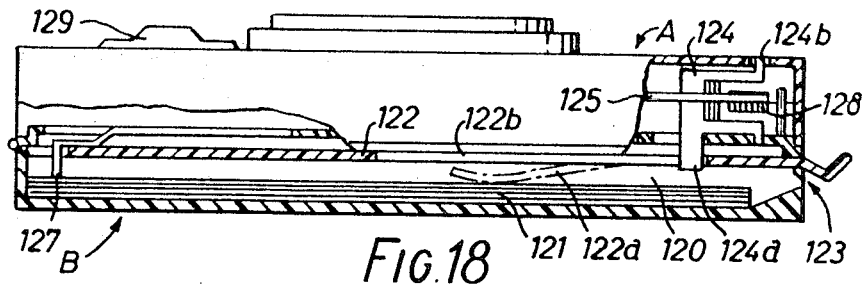
Figure 19:
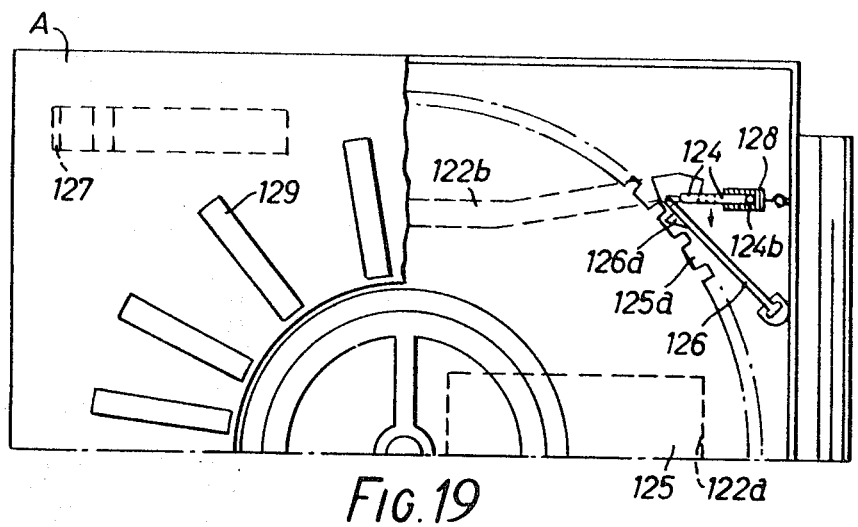
Figure 20:
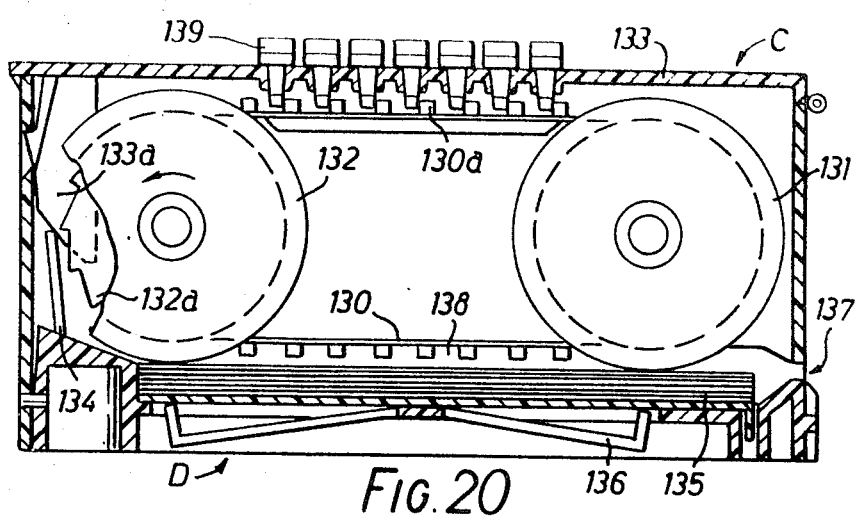

FIGS. 10 to 12 show apparatus in which in the correct answer is marked on the code bearing means and can be viewed through an aperture defined by the housing when the setting means have been moved to an additional position; and in which an error recording strip is received in the housing to provide a permanent record of questions where the answer has to be so discovered; FIG. 10 showing a partial cross section elevation of the apparatus and FIGS. 11 and 12 showing respectively plan view and cross section portion of the apparatus where the error recording strip is inserted;

FIG. 13 shows a partial cross sectional elevation of apparatus in which an additional position is provided for the setting means for the same reason as described with reference to FIGS. 10 to 12, but instead of providing an error recording strip, the apparatus is constructed so that the setting means cannot be removed from the said additional position whereby it is clear which questions could not be answered without first discovering the answer;

FIGS. 14 and 15 show respectively a partial plan view in partial cross section, a two part code bearing means, that is to say a code bearing means and a cord orienting means which have cooperating parts to form with the code means;

FIGS. 16 and 17 show similar views to FIGS. 14 and 15 but show another embodiment of the code means;

FIGS. 18 and 19 show respectively a partly broken away elevation and a partial view, again partly broken away, of apparatus cooperating for housing and dispensing pages bearing the questions;

FIG. 20 is a cross sectional elevation of apparatus having a code bearing member in the form of a band carried by two rollers and incorporating a page storage and dispensing device; and FIGS. 21 to 23 show embodiments of the invention including transparencies and means for viewing them, FIGS. 21 being a partial broken away plan view of the transparency holding and viewing position of apparatus coupled to the apparatus of FIG. 1, FIG. 22 showing a cross sectional elevation of apparatus similar to that of FIG. 20 where the page dispensing means are replaced by transparency viewing means, and FIG. 26 showing a partial cross sectional elevation of another embodiment of the transparency storing and viewing device coupled to the apparatus of FIG. 1.

Figure 2:
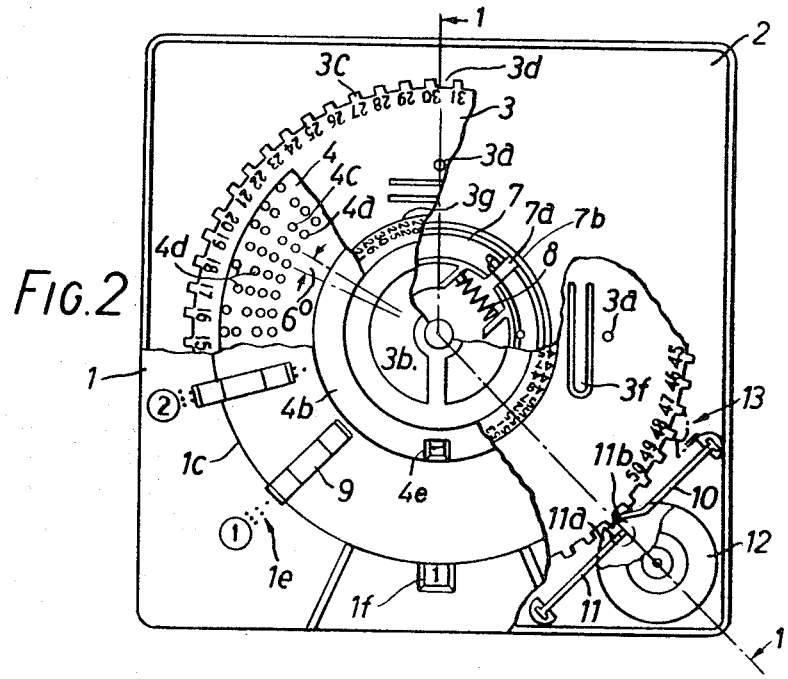

In the apparatus shown in FIGS. 1 and 2 the housing comprises a cover 1, acting as a supporting member for setting means or adjusting devices, and a base 2. A two part code bearing means, comprising a lower supporting disc or code orienting means 3 and a code bearing disc 4, is mounted rotatably and axially displaceably on a center in the third base pin 2a. Pegs 3a are carried by the lower supporting disc engaging holes belonging to a circle of holes 4a defined in the code bearing means to prevent any relative rotation between the two discs. Supporting disc 3 has a central portion 3b shaped as a turning knob and projecting through the top 1 of the housing; the code disc 4 has an integral annular portion 4b surrounding the portion 3b. A spring 6 urges the discs 3, 4 upwardly and generates a torque between the base 2 of the housing and the said discs. To prevent overwinding of the spring 6 when the two discs are rotated with respect to the housing as will be described, a friction clutch is disposed between the lower end of the spring 6 and the housing base 2. The clutch is best seen in FIG. 2 and comprises an annular member 7 which is broken by a slot 7a. The annular member 7 is located within an area bounded by an upstanding annular wall 7b of the housing and the annular member is expanded by a compression spring 8 so that its peripheral surface resiliently grips the wall 7b. The strength of the spring 8 is such that when the torque is generated in the spring 6 reaches a predetermined force the annular member 7 slips within the walls 7b thereby preventing further torque being generated in the spring 6 during winding. The adjusting devices are in the form of slides 9. They are mounted in a circular arrangement — substantially radially displaceably — in guide grooves 1a in the cover 1. The lower edge portions 9b of the guide webs 9a of the slides are somewhat wider then the guide grooves 1a and engage over the lower edges of the grooves. The slides 9 can thus be inserted in the grooves so that they will automatically be held in them. The guide webs 9a are each provided with a peg 9c at the bottom. The slides 9 have an inner neutral position marked by a circle 1a on the cover 1 of the housing. When they are in this position the pegs 9c are located between the locking pegs 4c of an uninterrupted circular row of pegs on the code disc, so that a switching step of the discs 3, 4 (resulting from the torque of the spring 6) is prevented so long as there is still a slide 9 in the neutral position. The code alignment is in three stages so that for each slide 9 there are three possible positions which will bring it into correspondence with the code alignment. These positions are marked at the places 1e with one, two and three dots. The code alignment is formed by cylindrical pegs 4d lying on three coaxial circles. The arrangement is such that for each longitudinal unit of code alignment, which in the present case is 6°, only two pegs 4d in each case will be radially one behind the other. The gap resulting from the absence of the third peg in each case determines the correct adjustment position of the slide 9 in question. Thus if all the slides 9 are pushed out of their neutral position and positioned so that all the slide pegs 9c coincide with gaps in the code alignment, the two discs 3, 4 will carry out an anti-clockwise verifying step in accordance with the winding direction of the spring 6. This step is of 6°, since when the discs 3, 4 have turned through 6° the adjacent pegs 4d of the code alignment will strike the pegs 9c of the slides 9. To enable the slides 9 to be set more securely they are provided with integral locking springs 9d which interact with locking recesses 1b formed in the underside of the housing cover.

Assuming the apparatus to be equipped with 12 slides 9, 12 questions would have to be answered per switching step of the discs 3, 4. As a longitudinal unit of code alignment is 6°, the discs carry out 60 switching steps per revolution, corresponding to a verifying capacity of 720 individual verifications.

To enable the apparatus to be set to any desired group of questions, a continuous row of numbers 3c is provided on the outer, peripheral portion of the supporting disc 3, projecting beyond the code disc 4; this row of numbers can be checked through a group aperture 1f.

In order to set the apparatus to a given group of questions, the two coupled discs 3, 4 are pressed down by means of the knob 3b against the compressive action of the spring 6, until the slide pegs 9c are no longer in engagement with the code alignment pegs 4. Then the two discs are turned clockwise until the desired numeral appears in the group aperture 1f. The spring 6 is stretched automatically in the process. It cannot be overwound on account of the slipping clutch 7, 7a. When the knob 3b is released the discs 3, 4 are urged upwardly again by the spring 6, so that in the position set the slide pegs 9c and the code alignment pegs 4d come back into engagement. In order to prevent the supporting disc 3 in the depressed position from springing back in the direction of the switching steps owing to the torque of the spring 6, the resilient check lever 10 located below the normal position of the disc 3 engages in the toothed ring 3d and locks it in the desired direction. A resilient bell hammer 11 is also provided, with its cam 11a in the operating plane of the disc 3. As soon as the disc carries out a switching step a tooth of the ring 3d passes over the cam 11a, so that the subsequent springing back of the bell hammer 11 causes it to strike a bell 12 with its metal head 11b and generate an acoustic signal.

In addition to setting the apparatus to sixty different groups of questions a primary adjustment to sixty different series is possible, each series containing sixty groups of questions. For adjustment to a given series the supporting disc 3 has to be turned relative to the code disc 4. For this purpose the knob 3b is this time pressed downwardly far enough to make pegs 3e on resilient tongues 3f strike the base 2 of the housing. The springs 3f thereby move upwardly and lift the code disc 4 far enough to bring the cams 3a out of engagement with the ring of holes 4a. Now the two discs 3, 4 can be turned relative to one another. The row of numerals 3g is provided on a shoulder on the knob 3b in order to check the relative position. For the sake of improved enciphering these numerals are arranged in non-numerical sequence. The row of numerals 3g is checked through a series aperture 4e in the edge 4b of the code disc. This second opportunity for adjustment increases the verifying capacity to 60 × 720 = 43,200 individual verifications.

It should be noted that — again for the sake of good enciphering — the mutual spacing of two adjacent slides 9 is at least equal to two longitudinal sections of code alignment, i.e. at least 12°. In addition the spacings between two successive slides 9 vary.

Since in a given type of apparatus the correct adjustment positions of the slides 9 for each group of questions of each series are settled once and for all from the start, groups of questions can easily be adapted to the apparatus when they are being worked out, i.e. those of the alternative answers which are correct can always be provided with the correct dotted marks. More specifically, each lesson card containing, say, 12 questions must be provided with the group number, with the series number, with continuous numbering of the 12 questions and with the correct association between the dotted marks and the alternative answers.

The possible arrangement of an end stop for the supporting disc 3 is shown at the location 14 (FIG. 2). If such a stop is provided the groups in a series can no longer be selected at will. Instead the groups of questions have to be worked through continuously from the first group onwards.

It is also possible for the apparatus to be equipped with only one slide 9. In this case the correct position of the slide could of course be determined by moving the slide backwards and forwards once, i.e. as soon as the slide peg 9c enters the gap in the code alignment the two discs 3, 4 carry out the verifying step. This disadvantage can be avoided by using a testing key 13. It is urged upwardly by a compression spring 13b and in this position engages in a gap in the toothed ring 3d by means of a lug 13a. Only when the slide 9 is correctly set and the testing key 13 additionally depressed can the discs 3, 4 carry out the verifying step. It is advisable to provide two testing keys 13, at a spacing such that both hands are always required to operate them, so that it is not possible to operate the testing key 13 with one hand and the slide 9 simultaneously with the other hand.

Where the verifying apparatus is to be used as a party game it is an advantage to provide an additional position for the slides, in which they cannot block the member carrying out the switching steps. If the apparatus has e.g. 6 slides then — if there are only four players — two slides can be made inoperative by putting them in the said additional position. Furthermore, the additional position of the slides makes it easy to check errors.

Figure 3:
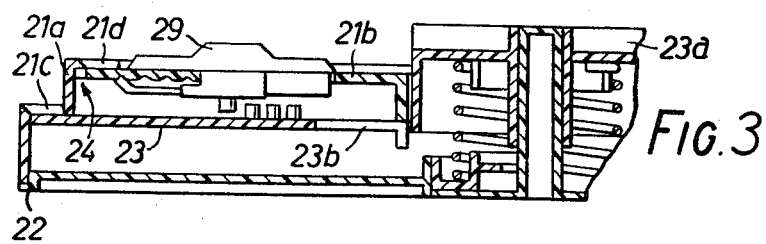
FIG. 3 shows a partial cross section of apparatus where the setting means are carried by supporting member supported by the housing, the housing and supporting member being relatively displaceable.

The apparatus in FIG. 3 differs from the preceding example primarily in the fact that the code member 23, in the form of a disc, is in one part. It again has a central portion 23a in the form of a turning knob. However, the supporting member for the slides 29, namely the housing cover, comprises the frame 21a and the disc 21b which can turn relative to the latter. The group setting is read in the group aperture 21c and the series setting in the series aperture 21d. In order to set a group of questions, the knob 23a is slightly depressed and turned clockwise until the correct group numeral appears in the aperture 21c. In order to set the apparatus to a different series the knob is depressed far enough to make resilient tongues 23b of the code disc 23 strike the base 22 and thus bend upwardly until the disc 21b, which is thereby raised, can turn freely. The series numeral is set in the aperture 21d by turning the disc 21b. In its operative position the disc 21b is held in position at its periphery by engagement between toothed rings 24 and the housing frame 21a.

Figure 4:
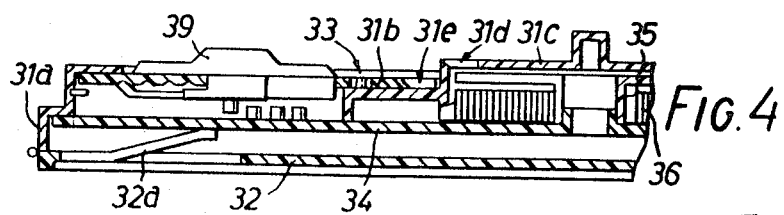
FIG. 4 is a partial cross section of apparatus having a code bearing member fixed within the housing and the setting means carried in a similar manner to that illustrated in FIG. 3.
Figure 5:
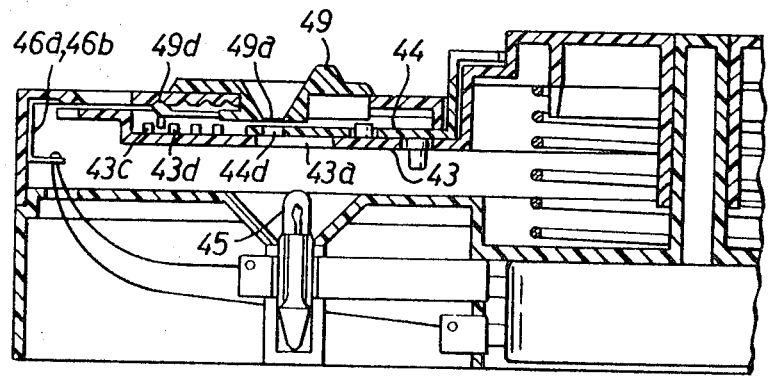
FIGS. 5 to 8 show an apparatus in which the types of each question answered by moving the setting means is verified by an illuminated portion of the setting means, FIG. 5 showing a partial cross section, FIG. 6 showing a partial top view, and FIGS. 7 and 8 showing parts of operating means for an electric light.
Figures 6, 7, 8:
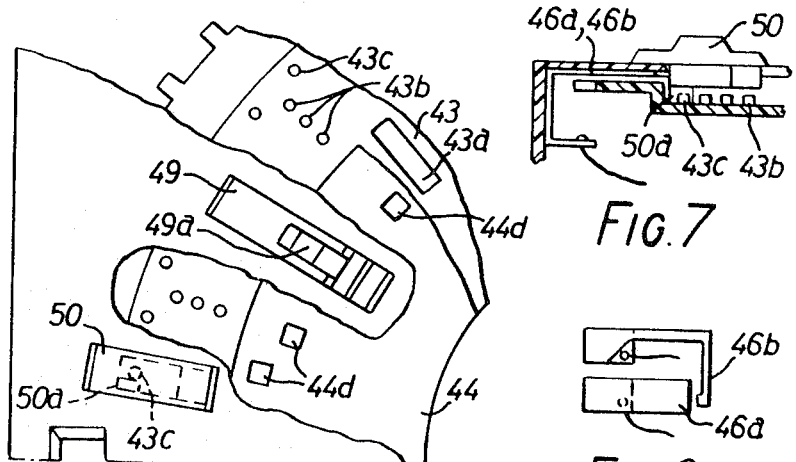

The apparatus in FIG. 4 has an interchangeable code disc 34 arranged non-rotatably in the housing frame 31a. It is pressed upwardly by resilient plates 32a of the base 32 which can be raised on hinges. A verifying disc 35 is coupled to the code disc 34 in such a way that relative rotation is impossible. The supporting member for the slides 39 is in two parts and comprises the outer circular ring 31b and the central disc 31c which is coupled to the ring at 33. A spiral spring 36 acts between the verifying disc 35 and the central disc 31c. To set the apparatus to a given group numeral and a given series numeral the central disc 31c is depressed against the action of the resilient tongues 32a. The ring 31b and central disc 31 are then adjusted until the correct group numeral appears in the group aperture 31d and the series numeral in the series aperture 31e. The verifying steps are carried out jointly by the two coupled parts 31b and 31c.

The apparatus shown in FIGS. 5 to 8 has a basic construction like that in FIGS. 1 and 2. An important difference is that the code alignment consists no longer of cams but of apertures 44d in the code disc 44. In accordance with the three stage code alignment the aperture provided per longitudinal unit of code alignment may be located on one of three concentric circles. The slides 49 have a translucent verifying portion 49a. The supporting disc 43 is provided with one radial slot 43a per code alignment step, so that each code alignment aperture 44d — whatever its position — can always be illuminated from below by lamps 45. The slides 49 are moved out of a neutral position according to the correct answering of questions. Once all the slides 49 are positioned a contact slide 50 has to be actuated. This interacts both with control cams 43b, 43c and switching contacts 46a, 46b. In the normal position of the contact slide 50, i.e. with the switching contacts open, the outer cam of the appropriate group of cams 43b lies against the side of the contact slide cam 50a in each case, as a result of a torque exerted on the discs 43, 44 by a torsion spring (not shown). When the contact slide 50 is moved against the contacts 46a, 46b it closes the light circuit. The two discs 43, 44 simultaneously advance abruptly by half a verifying step until a corresponding cam 43c strikes against the contact slide cam 50a. The code alignment apertures 44d are turned to bring them under the verifying portions 49a of the slides 49. With the slides 49 correctly positioned the verifying portions are now illuminated. In order to prevent the incorrectly positioned slides (with dark verifying portions 49a) from being displaced when the light circuit is operated, the locking springs 49d of the slides 49 have a downwardly directed projection which is located somewhere between control cams 43c, 43b in this position of the discs. When the contact slide is thereupon moved back to its starting position, the two discs 43, 44 make a subsequent abrupt half verifying movement (until the outer cam of the next group of cams 43b strikes against the contact slide cam 50). The slides 49 can now be freely moved again.

The group and series numerals are set in the same way as in the first example.

Figure 9:
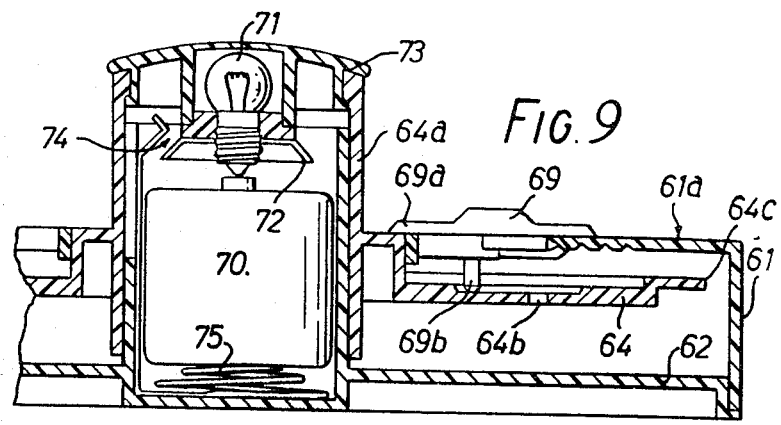
FIG. 9 shows an apparatus with a centrally mounted verifying light.

In the FIG. 9 apparatus the housing comprises the cover 61 and base 62. The code disc 64 is rotatably mounted in the housing with its central portion 64a, in the form of a turning knob, projecting through the top 61. The adjusting devices are in the form of slides 69. The code alignment consists of holes 64b. Once all the slides 69 are correctly positioned from their neutral position (in which the portions 69a thereof overlap one edge of the code disc 64) the slide pegs 69b register with the holes 64b of the code alignments. The code disc 64, including the battery 70, lamp 71, lamp contact 72 and covering cap 73, is moved upwardly by the spring 75 so that the electric contact 74 is closed and the lamp lit up. The apparatus can be set to a different group of questions by turning the knob until the desired group numeral on a dial arranged at the peripheral portion 64c of the code member 64 appears in a verifying aperture 61a (indicated in broken lines).

The apparatus shown in FIGS. 10 to 12 has the same basic construction as that shown in FIGS. 1 and 2 but is extended to accomodate a verifying sleeve. The sleeve 82 is accommodated in a circular slot 81a in the housing. It may, for example, be made of paper and should have self-adhesive end portions. When the sleeve has been placed in the slot 81a the self-adhesive ends are stuck together in the depression 81b in the housing cover 81. As the sleeve, when stuck together, has projections 81c engaging over it at least in the vicinity of the depression 81b in the housing, it can no longer be removed without tearing. The discs 83, 84 can be prevented from moving axially by means of a centrally fitted lock 85, so that only the set group of questions can be worked on and undesirable manipulations become impossible. Pointed marking members 89a pointing towards the sleeve are moulded onto the slides 89. If someone cannot answer a question he has a chance to move the appropriate slide 89 inwardly into an additional verifying position. The guiding slot 81d of the slide is uncovered enough to make it possible to read the setting instructions given in a suitable place at the edge 84a of the code disc 84. The schoolchild can thereby position the slide 89 accordingly and will indirectly learn the correct answer. During the verifying process the marking member 89a will have perforated the sleeve 82 in an appropriate place, so that the teacher will know later which questions could only be answered by previous verification. It is advisable to provide the code disc 84 with elongated projections 84b so as to ensure that the slides will remain in engagement with the code disc 84 in both their neutral and verifying positions, so that no verifying step will come about so long as a slide is still in one of the said positions.

The apparatus in FIG. 13 is very similar to that described above. The slides 99 can again be moved inwardly into an additional verifying position so that setting instructions can be read from the edge 94a of the code disc 94 through an open part 91b of the guiding slot. If a slide 99 is moved into the verifying position, a locking spring 99a which is integral with it will engage behind a peg 94b of the code disc 94. A continuous circular raised position could be provided instead of a plurality of pegs 94b. In order to release the slides the discs 93, 94 have to be moved axially downwards.

Instead of a verifying sleeve a permanently fitted, rotatably mounted error counting ring could be provided. It would be advanced step by step into the verifying position by tooth-like means as a result of displacements of the slides. The verifying ring would have to be provided with a row of numerals, so that the number of errors could be read through an aperture or from a mark, according to the position of the ring.

As shown in FIGS. 14 and 15, the code member comprises two overlapping parts 101, 102 which may, for example, be in the form of concentrically mounted discs. After being previously axially displaced a certain distance relative to one another, these discs may be turned relative to one another by an amount equal to any number of longitudinal units of code alignment. The upper disc 102 has four radially aligned apertures 102a per code alignment step. One of the two outer apertures 102a and one of the two inner apertures are surrounded by cams 102b. The lower disc 101 has two outer cams 101a or two inner cams per longitudinal unit of code alignment, to pass through the apertures 102a. As a result of this arrangement one of the code alignment steps per unit will always be left without a cam, whatever the position in which the upper disc 102 has been set relative to the lower disc 101.

Another procedure is for two outer apertures and two inner apertures 102a always to be regarded as pairs, of which one pair per unit is provided with a cam 102b. In this case the two cams 101a of the lower disc per unit must be located either at the outside or at the inside. The same system can be used if the code alignment is designed for a different number of settings. With a three stage code alignment, for example, no cam will be associated with the inner aperture of the upper disc, while one or other of the outer pair of apertures will have a cam. The lower disc must accordingly be provided either with two outer cams or with two inner cams per unit, so that one of the possible settings per unit will always be left without a cam. The cams may of course be constructed differently and may, for example, be round.

The code member in FIGS. 16 and 17 again comprises a lower disc 111 and an upper disc 112 which covers and is mounted coaxially with the disc 111. The discs can be turned relative to one another a distance equal to any number of longitudinal units of code alignment. The code alignment is made up solely of apertures which are partly (111a) formed in the lower disc 111 and partly (112a) formed in the upper disc 112. It is in four stages. One disc 112 accordingly has one inner or one outer double aperture 112a per unit. Each double aperture 112a could be divided into two single apertures. In the other disc 111, on the other hand, two apertures 111a are formed per unit, one of which is located in the circular region of the outer apertures 112a and the other in the circular region of the inner apertures 112a in the disc 112. This arrangement ensures that in any rotary position of the disc 111 relative to the disc 112 the apertures in any unit will register only in the region of one of the four possible settings. By turning the two discs 111, 112 relative to one another the code alignment is thus continually changed. The same effect can be achieved if the alignment is designed for a different number of possible settings. In a code alignment with three settings, one disc may have an outer one part or two part double aperture or an inner single aperutre per code alignment step, while the other disc is always provided with one inner aperture which is always on the same line and with one outer aperture which varies within the path of the double aperture, per code alignment step. In a code alignment with six apertures, the apertures — for example in the upper disc — are simply made longer. It is unnecessary to explain how the alignments described can interact in many different ways with adjusting devices, e.g. slides (slide cams, light control).

The parts 111, 112 of the code members in particular may be in the form of superimposed bands mounted on rollers (verifying apparatus with a code member in band form).

In the embodiment shown in FIGS. 18 and 19 a page dispenser B is arranged below the verifying apparatus A, which is only represented diagrammatically. In the page cavity 120 there are a number of pages 121 printed with questions. A drawing plate 122 serves to transport them through the delivery slot 123. It has a resilient tongue 122a which presses on whichever page is uppermost. The plate 122 is locked by a pivot member 124 which is mounted for rotation about the spindle 124b and acted on by a tension spring 128. In the normal position the pivot member 124 is subject to a torque acting in the direction of the arrow. The lower web 124a passes through a guiding slot 122b in the plate 122 and lies in a lateral extension of the said slot for locking purposes. The plate is thus locked. As soon as the supporting disc 125 of the apparatus carries out a verifying step as a result of the correct setting of all the slides 129, the lever 126 is actuated with the aid of the toothing 125a and the cam 126a. The cam tips the pivot member 124 so that the plate 122 is released and the top page can be transported with it. As soon as the plate 122, and with it the top page, have been drawn forward a short distance, the rear press 127 extends and secures the other pages. When the plate is pushed back the pivot member 124 is automatically returned to its locking position owing to the shape of the guiding slot 122b.

In the FIG. 20 apparatus the code member 130 is in the form of a band and runs over two rollers 131 and 132. Toothing (not visible) is provided only between the roller 132 and the band 130. A plurality of adjacent code alignments are provided, formed by the cams 130a. These interact with slides 139 mounted on the housing cover 133. The slides 139 are also partly juxaposed (although this cannot be seen from aperture FIG.) so that the slides which interact with a code alignment have a mutual spacing of at least two longitudinal units of code alignment. In order to set the apparatus to a given group of questions, the cover 133 has to be opened. When it is open it releases a locking spring 134 by means of an integral arm 133a. The spring engages in locking teeth 132a of the roller 132 and locks it against the action of a transporting spring (not shown). A row of numerals for verification and/or for setting the group of questions may be provided on the band 130 and interact with an aperture in the housing (for the sake of simplicity neither has been shown). Below the verifying apparatus C there is again a page dispenser D with a page cavity 138. The pages are shown at 135 and are pressed upwardly against the rollers 131, 132 by springs 136. After correct setting of all the slides 139 a verifying step the length of a code alignment unit is carried out by the band 130 and rollers 131, 132 in the direction of the arrow. The top page is consequently moved towards the slot 137 far enough for it to be freed from the roller 132. As the roller is not blocked it retains all the other pages, while the released page is moved through the delivery slot 137 by means of the roller 131.

The code alignment may obviously comprise illuminated apertures even when the code member is in band form. Furthermore, the two part construction of the code member which has been described with reference to a disc can readily be transferred to the code member 130 in band form for the purpose of additionally setting series. The code member may thus comprise two relatively displaceable bands, and the reading device for the series setting must be associated with the two bands, while the reading device for the group setting must be associated partly with one of the bands and partly with the housing.

In the FIG. 21 example a further apparatus F is coupled to the verifying apparatus E, which may, for example, correspond to that in FIGS. 1 and 2. The apparatus F contains an interchangeable cassette 140 equipped with a film 141. One of the two film bobbins 142, 143 is toothed and engages in a member 144 of the verifying apparatus, which is also toothed and which makes switching steps. The projecting device comprises a bulb 145 and a lens 146. If the apparatus is operating a transparency of the film 141 is projected. The transparency contains questions. When these have been correctly answered and the slides of the verifying apparatus are correctly positioned, the apparatus carries out a verifying step, whereby the next transparency is brought in front of the lens.

In the FIG. 22 apparatus the transparencies are on a band 150 which, like the code alignment band 151, moves around the two rollers 153, 154. Toothing (not shown) is provided between the two bands 150, 151 and at least one of the rollers 153, 154. The projector device comprises the lamp 155 and the lens 156. The slides are shown at 159.

In FIG. 23 an interchangeable disc 160 acts as the transparency support. It is mounted perpendicularly to the verifying apparatus G so as to rotate on a peg 161 of a supporting arm 162 placed on the verifying apparatus. A toothed peripheral portion of the disc 160 engages in a toothed ring of a disc 163 of the apparatus G (which disc performs verifying steps) so that the two discs are connected in rotation. The projector device comprises the lamp 164 and the lens 165. The transparencies mounted in the disc 160 are shown at 166.

In the examples given in FIGS. 21 and 23 the apparatuses may be designed so that all the elements which are required when using transparencies can be added to the verifying apparatus at a later stage.

If the game is to be played by several players at a party it is advisable for the pages of questions to be about the size of playing cards.

It is further proposed that the playing cards should have several different markings, preferably at the back whereby successive question cards at numerical intervals of one, two, three, etc. can be indicated in the same way; for example, cards with questions 1-3-5- ..... may have a red 2 and cards with questions 2-4-6- ..... a blue 2, cards with questions 1-4-7- ..... may have a red 3, those with questions 2-5-8- ..... a blue 3 and cards with questions 3-6-9- ..... a green 3, etc.; thus the cards may be dealt out quickly and safely, whatever the number of players, in such a way that the questions always have to be answered by one player after another.

The colours may be allotted before the game by throwing dice. Chips (possibly with different values) may also be used (with prizes for correct answers and fines for incorrect ones).

I claim:

1. Apparatus for playing an educational game comprising:
    a housing;
    a support means carried by said housing;
    a code bearing means in said housing;
    a plurality of code means on said code bearing means;
    a plurality of separate setting means operatively associated with and disposed along spaced locations on said support means, each said setting means being operable from outside said housing and having at least a portion extending into said housing;

means for connecting each of said plurality of setting means to said support means and for permitting movement of said setting means in a first direction into any one of at least two answer positions, each answer position of each said setting means corresponding to one of several possible answers to a given question associated with the setting means, one of such possible answers being the correct answer;

means for permitting relative movement between said code bearing means and the support means in a direction transverse to the first direction;

engagement means on a predetermined number of said setting means which engagement means selectively engage cooperating portions of said code means in said housing to prevent relative movement between said code bearing means and said support means when any one of the setting means is in a position corresponding to an incorrect answer, and to permit relative movement between said code bearing means and said support means only when a predetermined number of said setting means are in positions corresponding to respective correct answers.

2. Apparatus according to claim 1 in which each code means comprises a series of projections carried by the code bearing means and extending in the direction of travel of said setting means.

3. Apparatus according to claim 1 wherein said code bearing means is adapted to travel in a predetermined direction in a step-by-step fashion.

4. Apparatus according to claim 1 wherein said code bearing means carries a plurality of sets of code means spaced apart from one another in a predetermined direction.

5. Apparatus according to claim 4 wherein said code bearing means is prevented from movement in said predetermined direction by the engagement of said setting means with one set of said code means.

6. Apparatus according to claim 5 wherein movement of said setting means out of engagement with said one set of code means enables a biasing means to move said code bearing means in said predetermined direction until said setting means engages the next set of code means on said code bearing means.

7. Apparatus according to claim 6 wherein successive sets of code means are uniformly spaced from one another on said code bearing means so that said code bearing means moves in step-by-step fashion in said predetermined direction.

8. Apparatus according to claim 1 wherein said setting means are spaced from one another in a predetermined direction.

9. Apparatus according to claim 8 wherein said setting means are spaced from one another by non-uniform amounts.

10. Apparatus according to claim 1 wherein each of said setting means comprises a slide mounted in a groove in said support means, a portion of said slide extending into the interior of said housing and cooperating with said code means.

11. Apparatus according to claim 10 wherein said slide includes an integral, resilient locking member located within said housing and which engages the inner face of the support means, said support means being provided with at least two surface irregularities disposed to cooperate with said locking member so that said slide can be located in at least two positions.

12. Apparatus according to claim 1 wherein said code bearing means is a disc rotatably mounted in said housing; wherein each of said code means is a set of projections extending from said disc; and wherein said setting means is adapted to engage at least one of the projections of said code means.

13. Apparatus according to claim 12 wherein said code bearing means carries a plurality of code means, each code means disposed on said disc, the individual projections of each code means extending radially on said disc, the code means spaced from one another circumferentially around said disc.

14. Apparatus according to claim 13 wherein said setting means includes a projection adapted to engage at least one of the projections in the code means with which it associates.

15. Apparatus according to claim 14 wherein said setting means is adapted to engage a projection of said code means when said setting means is positioned corresponding to an incorrect answer, and further wherein said setting means is adapted to disengage those projections corresponding to incorrect answers when said setting means is positioned corresponding to a correct answer.

16. Apparatus according to claim 1 including a plurality of code means, said code means spaced apart from one another in a predetermined direction, said apparatus further including a first indicating means for indicating with which set of code means said setting means associates.

17. Apparatus according to claim 16 further characterized in that a plurality of setting means are connected to said support means and arranged on said support means in a predetermined direction, said first indicating means indicating the relative positioning of said indicating means with respect to said setting means.

18. Apparatus according to claim 16 further including code orienting means mounted in said housing, said code orienting means adapted to move in step-by-step positional adjustment with respect to said code bearing means, said code orienting means adapted to move said code bearing means in step-by-step positional adjustment with respect to said housing.

19. Apparatus according to claim 18 further including second indicating means for indicating the relative positional relationship of said code orienting means with respect to said code bearing means.

20. Apparatus according to claim 18 wherein said code bearing means and said code orienting means are concentric discs, and further wherein both said code bearing means and said code orienting means contain portions extending outside of said housing so that each can be moved with respect to the housing.

21. Apparatus according to claim 20 wherein the diameter of said code orienting means is greater than the diameter of said code bearing means; wherein said code orienting means is positioned adjacent said code bearing means; wherein said code orienting means and said code bearing means can be moved in step-by-step fashion to a plurality of positions with respect to one another; wherein said code orienting means bears a plurality of numerals, each numeral corresponding to one of the plurality of relative positions between said code orienting means and said code bearing means; and further wherein said code bearing means defines an aperture for viewing said numerals wherein said numerals and said aperture form an indicating means for indicating the relative position between said code bearing means and said code indicating means.

22. Apparatus according to claim 1 wherein said code bearing means is adapted to move in a predetermined direction independently of said setting means.

23. Apparatus according to claim 22 wherein said code bearing means is adapted to move back and forth in a second direction different from said predetermined direction; wherein said code bearing means is biased by a biasing means in said second direction so that said setting means engages said code means; and wherein movement of said code bearing means in said second direction opposite the direction of said bias disengages said setting means from said code means so that said code bearing means can move in said predetermined direction.

24. Apparatus according to claim 23 wherein said code bearing means is disc-shaped and wherein said biasing means is a spring adapted to impart rotational bias to said disc and also adapted to impart longitudinal bias to said disc acting axially of said disc.

25. Apparatus according to claim 24 wherein said spring is connected to said housing by means of a limited-slip clutch.

26. Apparatus according to claim 1 further including engaging means on said code bearing means; code orienting means having a first portion in said housing and a second portion outside said housing, said code orienting means being adjacent to said code bearing means and carrying engaging means adapted to cooperate with the engaging means on said code bearing means whereby the code orienting means and the code bearing means can be locked together in any one of a plurality of relative positions; said apparatus further including indicating means indicating the step-by-step positional relationship of the code orienting means with respect to the code bearing means.

27. Apparatus according to claim 26 in which a spring is mounted between an inside face of said housing and said code orienting means on the side of said code orienting means remote from the code bearing means whereby said spring urges said code orienting means into engagement with said code bearing means.

28. Apparatus according to claim 27 in which the code orienting means includes resilient tongues connected at one end to the code orienting means, and in which pegs are carried by the free ends of the resilient tongues and projected away from the code bearing means towards said inside face of the housing whereby upon movement of said code orienting means against the action of said spring towards said inside face of said housing, the projections push the resilient tongues above the level of the code orienting means so that the code bearing means is disengaged from and free to move with respect to the code orienting means.

29. Apparatus according to claim 1 in which said setting means has an additional position preventing movement of said code bearing means in a predetermined direction.

30. Apparatus according to claim 1 wherein said code bearing means is a disc and wherein said setting means is a slide mounted on said support means for radial movement with respect to said disc.

31. Apparatus according to claim 30 wherein a plurality of code means are positioned circumferentially about said disc for engagement with said slide.

32. Apparatus according to claim 31 wherein said support means is provided with a plurality of said slides, each slide positioned radially with respect to said disc.

33. Apparatus according to claim 32 wherein said code bearing means is adapted to move in a predetermined direction only when all of said slides are moved out of engagement with said code means.

34. Apparatus according to claim 1 wherein said code bearing means is a disc which is mounted for rotational movement with respect to said housing.

35. Apparatus according to claim 1 wherein said code bearing means is a disc adapted to rotatably move with respect to said housing, the periphery of said disc being provided with a plurality of teeth; said apparatus further characterized in that a rachet check lever is carried by said housing and positioned to engage said teeth, said ratchet check lever adapted to prevent movement of said disc in predetermined direction.

36. Apparatus according to claim 35 further including third indicating means mounted in said housing and positioned to be actuated by one of said teeth upon each movement of said code bearing means with respect to said setting means.

37. Apparatus according to claim 36 wherein said third indicating means is a bell.

38. Apparatus according to claim 1 wherein said code bearing means are uniformly spaced apart from one another in a predetermined direction; and further wherein said apparatus includes a plurality of setting means connected to said support means, said setting means spaced apart from one another in said predetermined direction by distances greater than the distances separating subadjacent code means.

39. Apparatus according to claim 1 in which said code bearing means defines holes which constitute said code means; in which said setting means is provided with a peg dimensioned and disposed to cooperate with one of said holes when said setting means is in a position corresponding to a correct answer; and in which a spring acts upon the code bearing means to cause respective holes and pegs to engage whereby the code bearing means is free to move towards the setting means.

40. Apparatus according to claim 39 further including indicating means for indicating the movement of said code bearing means towards said setting means.

41. Apparatus according to claim 40 wherein said indicating means is a light.

42. Apparatus according to claim 1 wherein the code bearing means defines apertures which constitute said code means.

43. Apparatus for playing an educational question and answer game comprising: a housing; a disc-shaped element mounted in said housing, a portion of said element extending outside said housing; means for rotatably mounting said disc relative to at least one part of said housing; a plurality of code means mounted on said disc-shaped element and spaced apart from one another adjacent the circumference of said disc; a plurality of setting means connected to said one part of said housing, each setting means adapted to move to a plurality of positions corresponding to the number of possible answers to a question, each setting means having means therein adapted to successively cooperate with said plurality of code means when said setting means is positioned corresponding to an incorrect answer thereby preventing rotational movement of said disc, each of said setting means adapted to disengage from its associated code means when positioned corresponding to a correct answer thereby permitting said disc-shaped element to rotate; and biasing means in said housing tending to cause said code bearing means to rotate relative to said housing.

44. Apparatus according to claim 43 wherein said setting means are spaced apart from one another by distances greater than the distance separating subadjacent sets of code means.

* * * * *